Aug. 13, 1935.  J. H. KEYS  2,011,320
LAWN SPRINKLER
Filed Sept. 15, 1930
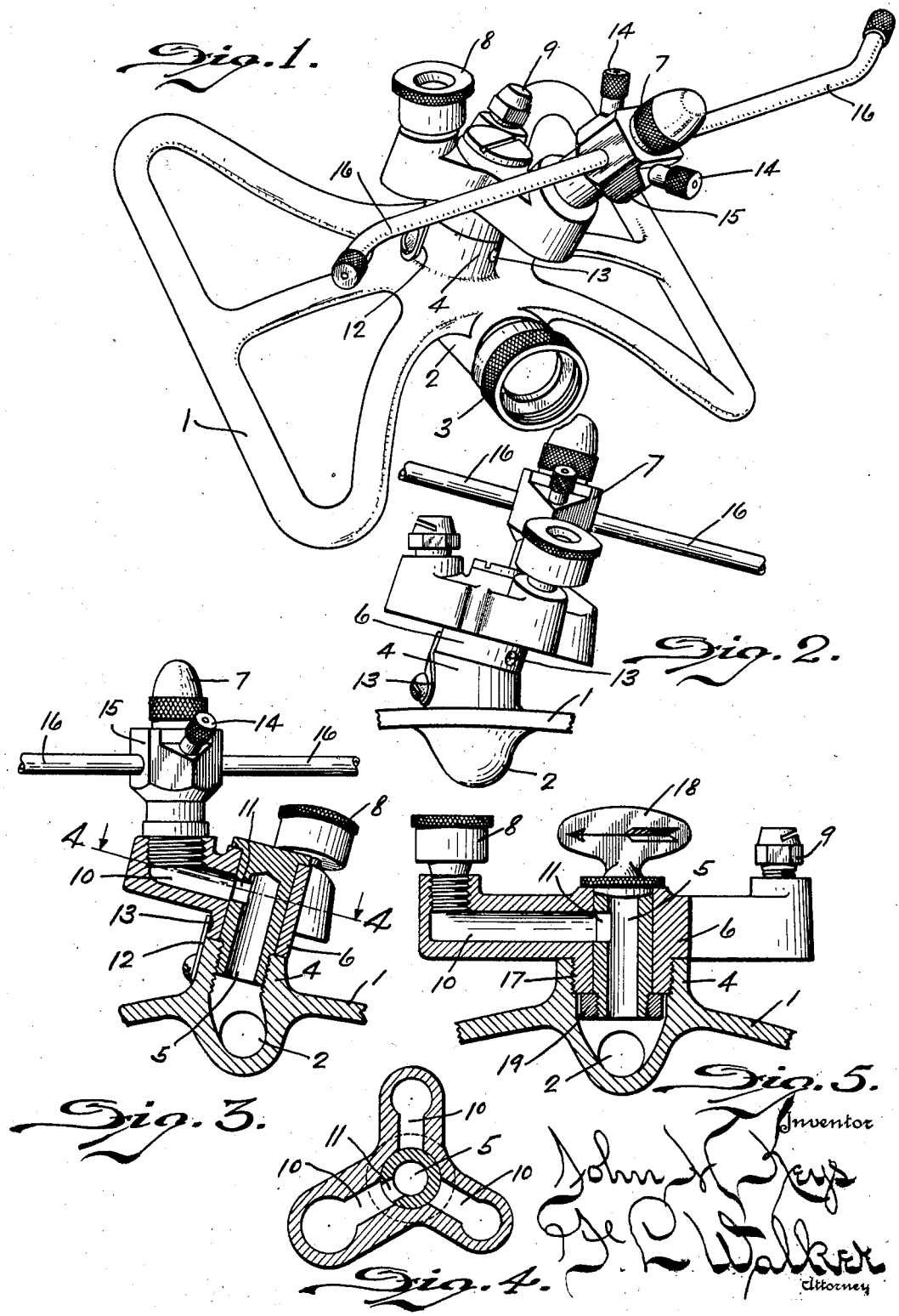

Patented Aug. 13, 1935

2,011,320

UNITED STATES PATENT OFFICE 2,011,320

LAWN SPRINKLER

John H. Keys, Dayton, Ohio

Application September 15, 1930, Serial No. 482,045

2 Claims. (Cl. 299—139)

This invention relates to lawn sprinklers and the like, and more particularly to a combination sprinkler having a series of nozzles of different character which may be employed alternatively.

While the combination sprayer head may be mounted upon permanently located stand-pipes or upon a continuous pipe line for spraying or watering gardens, flower plots, shrubbery and the like, for illustrative purposes it has been shown embodied in a portable lawn sprinkler. This combination sprinkler comprises a support or base on which is carried a distributor head having therein separate water supply passages leading to each of several nozzles carried by such head. In the present embodiment, the distributor head is shown provided with a rotary discharge nozzle propelled by water pressure, and covering an area of quite large diameter; a spray nozzle adapted to discharge laterally through a full circle but of less diameter than that covered by the rotary nozzle; and finally, a jet nozzle which preferably, though not necessarily, discharges a fan-shape stream covering a half-circle or less. The distributor head is mounted for rotation in an inclined plane so that by such adjustment, the different nozzles may be successively brought to an elevated position in which the trajectory of the discharged stream will be above the companion nozzles, which being depressed by the adjustment of the distributor head, will not interfere therewith. The water supply connection is such that only the discharge nozzle in the uppermost position of adjustment will be in operative connection, the water being excluded from the companion nozzles. The discharge position of the respective nozzles is disposed on a diameter transversely to the general direction of a water supply hose leading to the sprinkler. This enables the sprinkler to be propelled along a bit of shrubbery or flowers, or along a walk by pulling upon the hose while the discharged stream from the jet nozzle will continue to play upon such shrubbery or flower bed or upon the turf adjacent to the walk and obviates necessity for turning or readjusting the position of the sprinkler after being moved from one point to another.

The object of the invention is to simplify the structure, as well as the means and mode of operation of automatic sprinklers, whereby they will not only be cheapened in construction, but will be more efficient in use, positive in operation, uniform in action, easily adjusted to afford different spray and sprinkling effects, and unlikely to get out of repair.

A further object of the invention is to provide a combination sprinkler embodying a variety of different discharge nozzles alternatively operable at the will of the operator.

A further object of the invention is to provide upon a single unitary lawn sprinkler device a series of discharge nozzles of different character and to provide for separately connecting such discharge nozzles with a common water supply conduit.

A further object of the invention is to provide a combination sprinkler unit embodying a cluster of characteristically different discharge nozzles alternatively adjustable into and out of operative position which, when shifted to inoperative position, will be disposed out of the path of discharge of the operatively positioned nozzle.

A further object of the invention is to provide improved means for selectively connecting the water supply conduit with any one of a series of discharge nozzles.

A further object of the invention is to provide a sprinkler device having the discharge nozzles so arranged that the sprinkler may be moved from place to place and adjusted to the desired position by pulling upon the supply hose.

With the above primary and other incidental objects in view, as will more fully appear in the specification, the invention consists of the features of construction, the parts and combinations thereof, and the mode of operation or their equivalents as hereinafter described and set forth in the claims.

Referring to the accompanying drawing wherein is shown the preferred but obviously not necessarily the only form of embodiment of the invention, Fig. 1 is a perspective view of a portable lawn sprinkler in which the present invention is embodied. Fig. 2 is a side elevation of the distributor head and mounting and the discharge nozzles carried thereby. Fig. 3 is a vertical sectional view of the distributor head and its mounting. Fig. 4 is a transverse sectional view on line 4—4 of Fig. 3. Fig. 5 is a vertical sectional view illustrating a modification of the construction shown in the preceding figure.

Like parts are indicated by similar characters of reference throughout the several views.

In the accompanying drawing, 1 indicates the base or support of conventional form in which is embodied a water supply conduit 2 having coupling means 3 for engagement of a water supply hose. The base or support 1 is provided with an upstanding hollow hub or boss 4 which forms a continuation of the water supply conduit 2. As indicated in Figs. 1, 2 and 3, this hub or boss 4 is disposed at an inclination to the vertical, and receives a hollow inclined stem or trunnion member 5.

Revolubly mounted upon the stem or trunnion member 5 is a distributor head 6 which rotates about such stem 5 in an inclined plane. The distributor head 6 may be shaped to accommodate any desired number of discharge nozzles. That illustrated in the drawing carries three characteristically different discharge nozzles, to wit, a rotary nozzle 7, a circular spray nozzle 8, and a jet nozzle 9. The latter nozzle having an angular saw-cut orifice, 9a, as best seen in Figure 5 is preferably, though not necessarily, adapted to discharge a fan-shaped jet throughout approximately a half circle. The distributor head 6 is provided with radially disposed water passages 10, one for each of the discharge nozzles. These passages 10 within the distributor head 6 are non-communicating with each other, but alternatively communicate with the interior of the hollow stem or trunnion 5 and thence with the water supply conduit 2 through a lateral port 11 in such stem. The nozzles 7, 8, and 9 are disposed in the rotary distributor head 6 at such angles to its plane of rotation that when moved to their uppermost position by the rotation of the distributor head, such nozzles assume substantially vertical position, as shown in Figs. 1, 2, and 3. The lateral port 11 is so disposed in the stem or hollow trunnion 5 that it communicates with the water passages 10 of the head only when the head is turned to present the corresponding discharge nozzle in its elevated position. At such time, water supplied through the conduit 2 and hollow stem 5 is discharged from a single discharge nozzle which is always the nozzle positioned at the top of the inclined distributor head. By rotating the distributor head about the hollow stem or trunnion 5, different nozzles may be presented in this elevated operative position. At such time, the water supply is excluded from the companion nozzle, the passages 10 pertaining thereto being out of registry with the lateral port 11 of the stem 5. In order that the respective nozzles may be accurately positioned in their elevated operative position, indexing means is provided comprising a spring finger 12 secured to the hub 4 for engagement in properly positioned depressions 13 in the hub of the distributor head 6.

The rotary nozzle 7 is of the type shown and described in detail in my copending application Ser. No. 351,510, filed April 1, 1929. It includes jet nozzles 14 carried by a rotary head 15 from which project in opposite directions propulsion jet arms 16 by which the nozzle assembly is given rotary motion. The jet nozzles 14 and arms 16 discharge over a wide radius. For water distribution through a more restricted area, the spray nozzle 8 is employed. This nozzle is of conventional type adapted to discharge water in a substantially cone-shaped formation, over a circle of considerable area but of less extent than that covered by the rotary nozzle 7. For use in restricted places, as for watering narrow strips of turf beside walks or roadways and for watering beds of shrubbery or flowers where the area to be covered lies wholly at one side of the position in which the sprinkler is conveniently located, there is provided the third jet nozzle 9 which, as before mentioned, preferably discharges a fan-shaped spray. Thus the present sprinkler is an all-purpose device having provision for a wide variety of discharge streams, and adapted to cover either a wide area or a more restricted space. It enables the performance with a single sprinkler unit of the work which ordinarily would require at least three separate units and entail the inconvenience and labor of disconnecting the hose and reconnecting it first to one and then another. In the present construction a variety of discharge nozzles is always at hand ready for instant use to meet different requirements and different conditions.

By mounting the distributor head 6 for rotation about an inclined axis, and operatively connecting only the elevated or uppermost nozzle with the water supply, the companion nozzles are depressed below the path of discharge from the operative nozzle and therefore do not interfere with the water distribution. This enables the cluster of discharge nozzles to be much more closely positioned one to another, reduces the necessary material, and materially lightens the weight of the structure. There is thus afforded a very compact distributor unit.

In Fig. 5 the several nozzles have been illustrated mounted at a uniform level in which case the distributor head 6 is extended radially a greater distance in order that the nozzles may be spaced apart sufficient distance to avoid interference of such nozzles with the stream emanating from other nozzles. Fig. 5 illustrates a further modification wherein the distributor head 6 is stationarily mounted upon the base or support 1 by means of a screw threaded connection 17 within the boss or hub 4 of the base, while the hollow stem 5 is revolubly mounted within the distributor head 6. The hollow stem 5 is provided with a handle 18 by which the stem may be rotated relative to the distributor head to present the lateral port 11 of such stem successively in registry with the passages 10 of the head 6. Thus by rotating the stem 5, different discharge nozzles may be operatively connected with the water supply conduit 2. A retaining collar 19 is threaded upon the lower end of the rotary stem 5 in Fig. 5 to prevent its withdrawal.

The operative or elevated position of the discharge nozzle is preferably disposed upon a radius extending transversely in relation with the axis of the water supply conduit 2. This is especially effective when employing the jet nozzle 9, since it causes the jet to be discharged laterally relative to the general direction of the water supply hose leading to the coupling 3 of the conduit 2. With this disposition of the jet nozzle discharging laterally relative to the hose line, the sprinkler may be shifted from place to place by pulling upon the supply hose. It is not necessary to shut off the water in order to turn the sprinkler unit to the proper position for directing the spray from the jet nozzle 9, and there is no danger of the operator becoming wet from such spray when shifting the position of the sprinkler.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise the preferred form of several modes of putting the invention into effect and the invention is, therefore, claimed in any of its forms or modifications within the legitimate and valid scope of the appended claims.

Having thus described my invention, I claim:

1. A portable lawn sprinkler including a ground engaging support having an upwardly projecting hollow boss disposed at an angle to the vertical, a distributor head having a hub journaled on the boss and having hollow spoke-like parts extending radially from said hub, a rotary spray head journaled on one of the spoke-like parts in fluid communication with its hollow interior and with its axis of rotation projecting upwardly and outwardly therefrom so as to lie at an acute angle to the hub, oppositely disposed diverging nozzles carried respectively by and in communication with the hollow interior of the other spoke-like parts at the sides of the head, and a port in the upper side of said hollow boss communicating with the hollow interior of said boss, said distributor head being so constructed and arranged that when rotated about said boss to bring the respective spoke-like parts into uppermost position communication will be established solely between said port and the hollow interior of the uppermost spoke-like part.

2. A portable lawn sprinkler in accordance with claim 1 wherein there is means for selectively holding the distributor head in position with any one of the spoke-like parts of the distributor head in uppermost position relative to the support, which means includes a spring device carried by one of the last two named elements and keepers carried by the other of said elements to hold the head in selected operative position.

JOHN H. KEYS.